Sept. 13, 1938.  P. SPORN ET AL  2,130,201
MULTIRATE METER
Filed Feb. 28, 1936  2 Sheets-Sheet 1
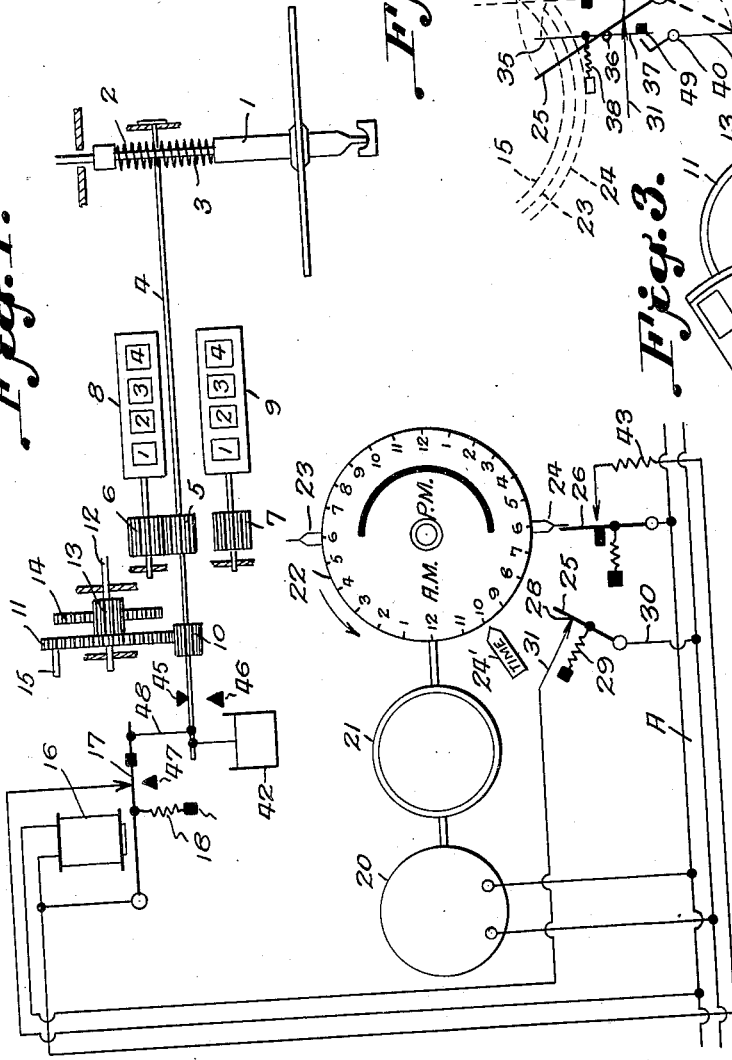
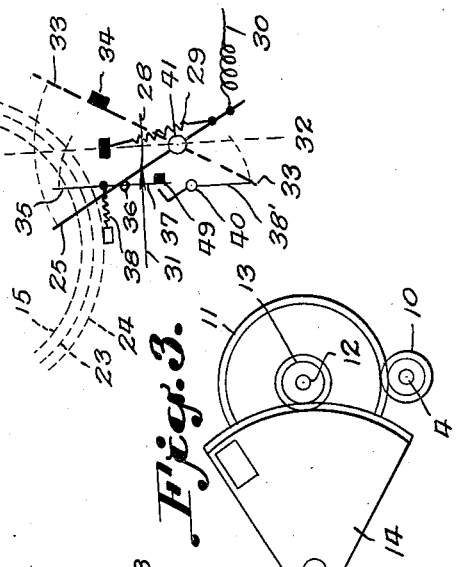
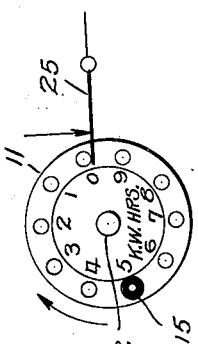

Sept. 13, 1938.                P. SPORN ET AL                    2,130,201
                                MULTIRATE METER
                              Filed Feb. 28, 1936              2 Sheets-Sheet 2
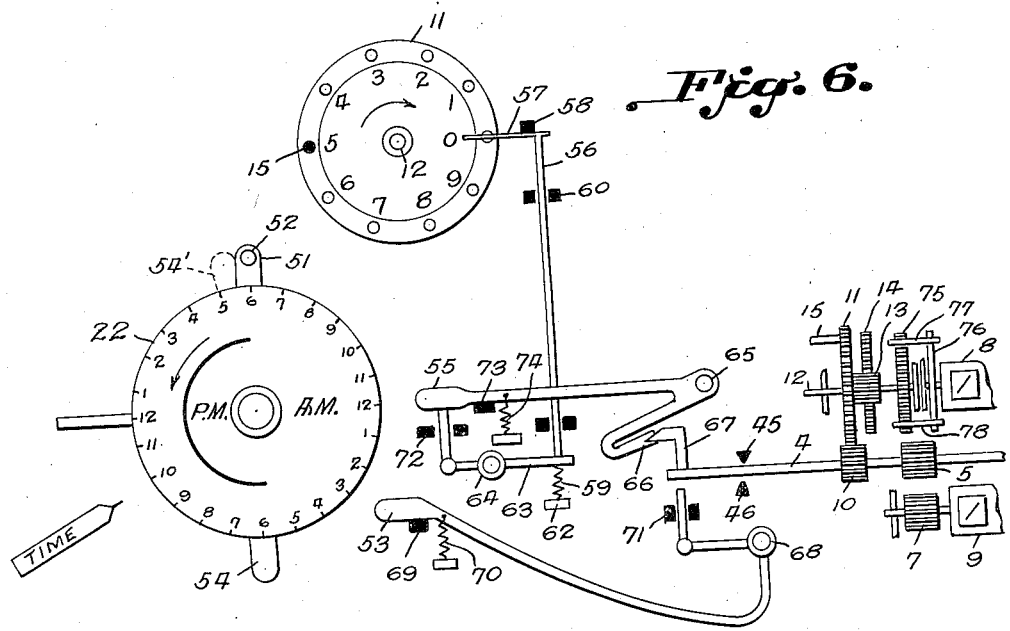
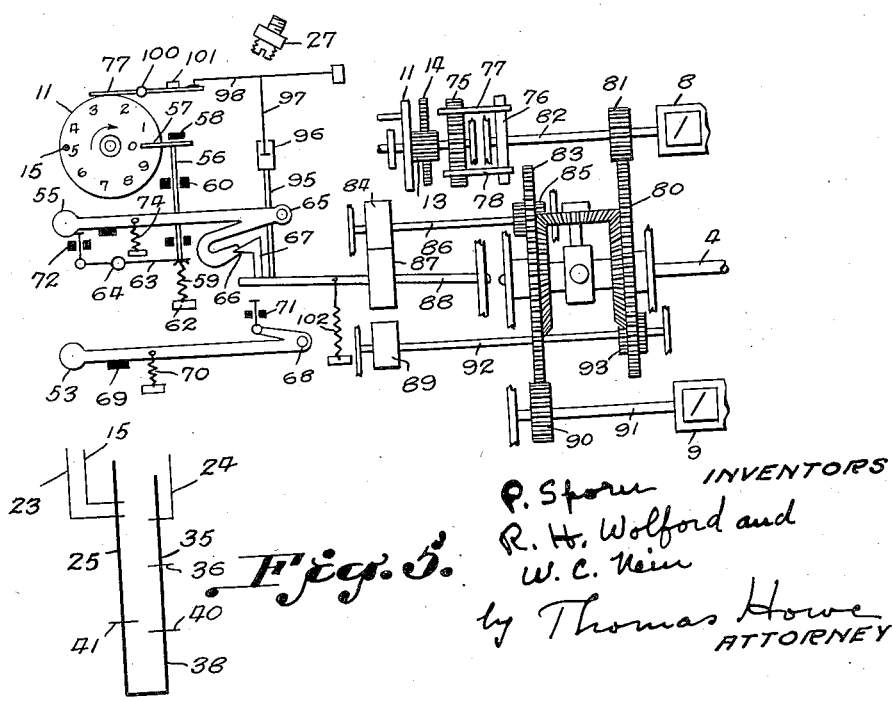

Patented Sept. 13, 1938

2,130,201

UNITED STATES PATENT OFFICE 2,130,201

MULTIRATE METER

Philip Sporn, Brooklyn, N. Y., Ray H. Wolford, Elizabeth, N. J., and William C. Nein, Tuckahoe, N. Y.

Application February 28, 1936, Serial No. 66,186

3 Claims. (Cl. 171—268)

This invention relates to means applicable to electric metering apparatus whereby the amount of electrical energy passing through the metering apparatus in a predetermined time interval may be recorded on separate recording mechanisms in a predetermined manner.

The main object of this invention is to provide means whereby after a predetermined amount of electrical energy has been recorded the apparatus automatically changes to another recording device for the remainder of a predetermined time interval such as a day of twenty four hours, and returns automatically to the former recording apparatus at the end of the predetermined time interval.

Another object of the invention is to provide means whereby the consumption of a predetermined amount of electrical energy can effect a change from one recording apparatus to another during a predetermined time interval, the change being effected at the end of the predetermined time interval regardless of whether the consumption of the predetermined amount has taken place or not.

Other objects of the invention will be apparent from the description which follows.

Fig. 1 shows a schematic arrangement of the various parts of the invention.

Fig. 2 shows a schematic arrangement of a dial having adjustable means for effecting an electrical circuit opening device.

Fig. 3 shows a view of the means employed in returning the dial in Fig. 2 to its initial position.

Fig. 4 shows schematically a type of electrical switch suitable to effect a change of the recording means from one position to another.

Fig. 5 shows schematically a side view of Fig. 4 with the throw over spring omitted.

Fig. 6 shows a mechanical method of carrying out the invention.

Fig. 7 shows a differential register drive.

Referring to the drawings, 1 is the shaft of a watthour meter rotating element having a worm 2, cut on it, with which engages a worm wheel 3, suitably mounted on a shaft 4. The shaft 4, carries a driving pinion 5 which is so arranged as to engage either pinion 6 or 7 driving in turn the recording devices 8 or 9 depending on its position. The recording devices 8 and 9 record kilowatt hours of electrical energy passing thru the watthour meter which effects a rotation of the shaft 1 in a well known manner. The shaft 4 also carries a pinion 10 which meshes with a suitably mounted gear wheel dial 11 and drives it in accordance with the amount of consumed electrical energy in a manner similar to which it drives kilowatt hour dial 8. The gear wheel dial 11 is mounted on a shaft 12 which also carries a pinion 13. A weighted sector of a gear 14 meshes with pinion 13 to effect a return of the dial 11 to its initial position as will be described later. The gear wheel dial 11 carries a circuit interrupting pin 15, and is arranged to be adjustable as is shown in Fig. 2, to a predetermined number of kilowatt hours consumption of electrical energy before effecting an interruption of the electrical circuit and the operation of which will be described later.

The position of the shaft 4, pinions 5 and 10 is controlled by a relay 16. When the relay is energized the various parts are in the position as shown in the drawings in which case kilowatt hour dial 8 records the consumed electrical energy. When the relay 16 is deenergized the kilowatt hour dial 9 records the energy. The armature 17 of the relay 16 when the relay is deenergized can fall either by gravity or be pulled to its off position by a spring 18. The shaft 4 is suitably connected to armature 17 with a flexible connection 48 so as not to retard the movement of the armature from the on to the off position. The relay 16 is a well known type, known as a "stick" relay, in which, when the circuit is established its armature is held in the on position by current thru its own armature as is shown in Fig. 1. 45, 46 and 47 are movement limit stops.

A, is a source of alternating current power from which energy can be taken to cause the shaft 1 to rotate as is well known; the complete watthour meter and connections not being shown here. 20, is a self starting synchronous motor connected to source of power A, which drives a suitable reduction gear 21, and which in turn drives a dial 22. The dial 22 carries adjustable circuit opening fingers 23 and 24, and has a fixed indicator 24' for setting the dial 22 according to the time of day. The whole arrangement is similar to an ordinary well known time switch. 25, is a circuit interrupting switch the details of which are shown in Fig. 4. 26, is a circuit closing switch which is used to restore the armature 17 of relay 16 to its on position as will be described later.

Fig. 2 shows schematically adjustable means for operating the circuit interrupting switch 25. The opening of switch 25 interrupts the energy from the source of power A to the relay 16 causing its armature 17 to drop disengaging dial 11 from its driving pinion 10 and engaging pinion 5 with pinion 7 which drives recording device 9. The pin 15 which can be adjusted to any of the holes shown trips the switch 25 when a predetermined amount of electrical energy has passed thru the watthour meter.

Fig. 3 shows a weighted sector of a gear 14 which meshes with a pinion 13 attached to gear dial 11. When the shaft 1 revolves, as can be seen from Fig. 1, the sector 14 is raised from its zero stop 27 as the gear dial 11 rotates; and when pin 15 opens the switch 25 deenergizing relay 16 it returns to its zero position together with gear dial 11.

Fig. 4 shows schematically an over the center switch pivoted at 41, which opens or closes contact 28 and is held in either position by the spring 29. The conducting wire 30 is so arranged to flexibly follow up the switch arm 25. The conducting wire 31 is so arranged to follow up the switch arm 25 and stop at a fixed point, just as or after the switch arm 25 goes over the center 32, insuring a continuous circuit to the over the center position of switch 25 and also insuring that switch 25 will go to its off position. 35, is one arm of a toggle, used to restore switch arm 25 to its on position, pivoted at a point 36 and held against a zero stop 37 by a spring 38. 38' is the other arm of the toggle switch which is pivoted at point 40. A force applied to the upper end of arm 35 will pick up the upper end of the arm 38' and cause pressure on the lower end of switch 25 in such a direction and to such an extent as to cause it to move over the center to the on position. The arrangement is simplified by referring to Fig. 5.

Fig. 5 shows a schematic arrangement of the parts of Fig. 4.

The operation of the complete device may be considered under two different operating conditions but with both based on a twenty four hour energy consumption basis. The first condition may be considered as a 6 A. M. to 6 A. M., on the following day, condition for high rate energy with the provision that as soon as a predetermined number of kilowatt hours of energy are used the recording apparatus changes from a high rate kilowatt hour dial to a lower rate kilowatt hour dial. If the predetermined number of high rate kilowatt hours is not used between 6 A. M. and 6 A. M. of the following day the daily cycle is repeated starting from zero. The second condition may be considered from a 6 A. M. to 6 P. M. to 6 A. M. basis, where from 6 A. M. to 6 P. M. the energy used is recorded on a high rate kilowatt hour dial with the provision that as soon as a predetermined number of kilowatt hours of energy is used the device changes to the lower rate kilowatt hour dial; and that it changes to the lower rate kilowatt hour dial at 6 P. M., and then back again to the high rate kilowatt hour dial at 6 A. M. of the following day beginning the cycle anew from zero.

The synchronous motor 20, reduction gear 21 and dial 22 may be considered as a well known time switch, having switches 25 and 26 located in approximately the same plane. The switch 25 is located so that it is closed before switch 26 is closed. Switch 26 opens again after the closing arm 24 passes by, it being always open except for the few minutes it takes for arm 24 to actually pass and has a current limiting resistance 43 in the closing circuit.

The sequence of operation for the first condition, in which the arm 23 is omitted, is as follows: When power is taken from the source A, the shaft 1 of the rotating element of the power recording watthour meter revolves driving kilowatthour dial 8 and also the gear wheel dial 11 with its circuit interrupting pin 15. Assume the pin 15 is set at 5 kilowatthours as shown in Fig. 2; when 5 kilowatt hours of energy has been recorded on dial 8 the pin 15 will have revolved to a position where it has opened the switch 25 deenergizing the relay 16 as can be seen by tracing the energizing circuit of the relay. When the relay 16 is deenergized it releases its armature 17 which falls dropping shaft 4 so as to engage pinion 5 with pinion 7 thereby driving lower rate kilowatthour dial 9. Where a plain spring contact 25 is used as is shown in Fig. 1 and Fig. 2 a dash pot 42 on shaft 4 to slow its movement may be needed but which is not necessary if a switch similar to Fig. 4 is used as the switch shown as 25 in Fig. 1 and Fig. 2. When shaft 4 drops, pinion 10 disengages gearwheel dial 11 which is returned to zero by the gear sector 14 as is shown in Fig. 2 and Fig. 3. The gear sector comes to rest against stop 27 at which point the gear wheel dial 11 is in its zero position. The lower rate dial 9 now records all the energy used until 6 A. M. of the following day. When 6 A. M. is reached the circuit closing arm 24 of the time switch closes the circuit including contact 28 and then closes the circuit including the switch 26 energizing the relay 16 which attracts its armature 17 and which in turn throws into engagement the high rate dial 8 and gearwheel dial 11 placing the complete device in a position to renew the daily cycle of operations.

The sequence of operations for the second condition namely from 6 A. M. to 6 P. M. to 6 A. M. is briefly the same as for the 6 A. M. to 6 A. M. condition with the exception that the circuit closing arm 23 is now used and the low rate dial 9 is thrown into engagement at 6 P. M. whether a predetermined amount of high rate energy is used or not, the arm 23 located at 6 P. M. on the dial 22 effecting the change from the higher rate to the lower rate kilowatthour dial by opening the switch 25 and deenergizing the relay 16. When 6 A. M. of the following day arrives the time device 22 with its arm 24 will close the switch 26 energizing relay 16 which attracting its armature 17 throws into engagement the higher rate kilowatthour dial 8 beginning the daily cycle anew.

Referring now to Figs. 4 and 5 these figures show a switch suitable for use as the switch 25 of Figs. 1 and 2. The arm 25 is the switch movable on axis 41 and held in the off or on position by the spring 29. The dotted line 33, 33 shows its off position. It is thrown from the on position to the off position by being placed in the path of the travel of pin 15 and arm 23 as is shown by the dotted lines of travel in Fig. 4. The follow up contact 28 follows the movement of the arm 25 up to the point where the arm 25 is quickly thrown to the off position by the spring 29 or just over the center as represented by the dotted line 32. It is thrown from the off to the on position by arm 24 whose path of travel, as shown by the dotted line 24 Fig. 4, is such as to engage one end of a lever 35 movable on pivot 36 and which is held against a stop 49 by a spring 38 which lever 35 on one end engages one end of another lever 38' movable on pivot 40. The stop 34 limits the throw of lever 25 in the off position 33—33. The contact 31 is a follow up contact and breaks just as 25 goes over the center.

Fig. 5 shows the operating planes of the various parts of Fig. 4.

Referring now to Fig. 6, the schematic arrangement shown in this figure as can readily be seen is an arrangement of mechanical parts, the operation of the various members of which accomplish the objects of the invention. The following is a brief description of the various parts constituting the whole. 22 is a time dial driven by a self-starting synchronous motor as previously described with reference to Fig. 1. 51 is an operating arm of the time switch which carries a pin 52 and which together with the lever 53 operate in such a manner as to restore the registering mechanism to the higher rate dial at whatever time the arm 51 is set for. As shown at 6 A. M. 54 is an operating arm which operates the lever 55 tripping the mechanism so that the lower rate dial comes into operation at whatever time the arm 54 is set for. It is shown at 6 P. M. 11 is a gear wheel dial mounted on a shaft 12, with operating pin 15, the whole of which operates as previously described in Fig. 1; as shown, it is set to trip when 5 kilowatt hours have been consumed. 56 is an operating lever having an extension or indicator hand 57; it is held against a stop 58 by means of the spring 59 and moves in guides 60 and 61. The spring 59 is under compression and is held by support 62; it presses against the lever 63, the whole being held against a stop 58. The lever 63 is pivoted on pin 64, operates in guides 70 and has its upper end in operating relation with lever 55. Lever 55 is pivoted at 65, has a stop 73 and is provided with a catch 66 suitably designed to hold trigger 67 which is fastened to shaft 4. The shaft 4 is the same as previously described in Fig. 1, that is it is driven by the watt hour meter motor. The lever 53 is pivoted at 68, is held against the stop 69 by means of the spring 70 and has one end so arranged as to move in the guide 71. The end of the lever 53 is in the same horizontal operating plane as the lever 55. One is, however, alongside the other or in a different vertical plane so that at, say, 6 A. M. arm 51 with its extending pin operates lever 53 whereas at 6 P. M. arm 54 operates lever 55.

The operation of Fig. 6 as a complete device when adjusted for the condition of a predetermined number of kilowatt hours consumed before the mechanism shifts from the higher to the lower rate dial from say 6 A. M. to 6 A. M. on the following day is as follows:

The meter motor 1 drives the shaft 4 which in turn drives the gear wheel dial 11, which dial is rotatably mounted on the shaft 12. Assume that 5 kilowatt hours of energy must be consumed before the device shifts from the higher rate register 8 to the lower rate register 9 Fig. 1. In this case the pin 15 is inserted at 5 as shown and 11 revolves in a clockwise direction until the pin 15 strikes the indicator 57 whereupon it pushes the shaft 56 down against the lever 63 which in turn lifts the lever 55 tripping the trigger 67 and thereby dropping the lower rate register 9 into operation. In the event 5 kilowatt hours of energy is not consumed between 6 A. M. to 6 A. M. of the following day, and say only 3 kilowatt hours of energy have been consumed, in order to start the complete daily cycle anew the arm 54 is set slightly ahead of arm 51 as shown by dotted lines 54'. This operates lever 55 tripping 67 and throwing in the lower rate register which operation releases the gear wheel dial 11 so it can return to zero as shown in Fig. 1. Within a few minutes pin 52 comes into operating relation with lever 53 and restores the higher rate register dial into operation. It is to be understood that these operating arms, 51 with pin 52, and 54 can be so designed as to trip and reset within as short a time period as is necessary for all practical purposes. Lever 53 can be made similar to lever 55 with a trip 66 and trigger 67 if deemed necessary to get quick action movement from the low to the high rate register.

For the condition of change over from the higher rate register to the lower rate register after a predetermined number of kilowatt hours of energy have been used between 6 A. M. to 6 A. M. of the following day, and a change over at say 6 P. M. is to be made regardless of whether 5 kilowatt hours have been used or not, the arm 54 is placed as shown in Fig. 6, at 6 P. M. Also the arm 51 together with its pin 52 are placed as shown at 6 A. M. In this case as soon as 5 kilowatt hours are consumed as recorded on higher rate dial 8, Fig. 1, the lower rate dial 9 Fig. 1 is put into operation (as previously described); and if 5 kilowatt hours have not been consumed before 6 P. M. the arm 54 trips lever 55 throwing in the lower rate dial 9 and restoring dial 11 to zero. The hand or indicator 57 can be used to show the consumer just how much energy he has consumed and gives an indication as to when he can expect energy at the lower rate. The dial wheel 11 can be so arranged to drive the high rate dial direct by means of a ratchet wheel 75 with pawl holding bracket 76 having two pawls 77 and 78. This dispenses with pinion 6 Fig. 1. The pawls can be positioned so that when one pawl is in driving engagement with the tooth on ratchet wheel 75 the other pawl is one-half way on a tooth which gives the equivalent of a ratchet wheel with double the number of teeth. More than two pawls can also be used proportionally spaced on their respective teeth. The ratchet drives in the clockwise direction when viewed from left to right on shaft 12 and slips when pinion 10 is disengaged from wheel 11, wheel 11 returning to zero by the weighted sector 14.

Referring to Fig. 7 this figure shows a differential drive of the registers 8 and 9 by the shaft 4. Since a differential is a well-known device its operation will not be described in detail. The operation of the several parts shown in this figure are similar to those described in Fig. 6 with the following additions:

As shown the shaft 4 drives the register 8 thru the differential gear 80, pinion 81 and shaft 82. The shaft 82 drives the gear wheel dial 11 with its return gear sector 14 thru a pawl and ratchet arrangement similar to that described in Fig. 6 and which has the same reference characters and which dial 11 operates as previously described. As is well known in the case of a differential, if one of the wheels is held the other drives and vice versa. In this case with 4 driving 8 the wheel 83 is held by means of a brake wheel 84 shaft 86 and pinion 85 which pinion meshes with the gear wheel 83. The brake wheel 87 mounted on shaft 88 holds the brake wheel 84 either of which wheels can be made of material suitable for the purpose. When the brake wheel 87 is shifted to the lower position or in contact with and holding brake wheel 89 the brake wheel 84 is released thereby releasing gear 83 effecting the driving of register 9 thru pinion 90 on shaft 91, at the same time brake wheel 89 on shaft 92 holds gear wheel 80 by means of pinion 93 preventing any movement of shaft 82. In this case the gear wheel dial 11 is released so that it can return to zero by means of connecting link 95, slack link 96 and connecting link 97 which are fastened to shaft 88 at one end and lever 98 at the other end, the lever 98 has one end enclosed at 99 with its other end resting on one end of the pawls 77—78, which pawls are movably mounted on pivot 100 and are held against a stop 101 by a suitable spring not shown, and when it is depressed by shaft 88 moving from the upper to the lower position after being tripped by an upward movement of lever 55 it pushes down on pawl 77—78 releasing the ratchet wheel 75 allowing wheel dial 11 to return to zero. The spring 102 merely assures sufficient pressure between brake wheels 87 and 89 to prevent slipping. The levers 53 and 55 are operated by the time switch 50 with its levers 54 and 51 as previously described in connection with Fig. 6, the dial wheel 11 also operates in a manner similar to that described in Fig. 6.

Having thus described our invention, what we claim is:

1. The combination of an electric watthour meter, two integrating watthour registers, means for driving said registers by said watthour meter in proportion to the metered energy and means controlled by the time and also by the energy metered during a given time period for alternately connecting said driving means in driving relation to said registers, said metered energy causing the shifting of said driving means from one register to another after consumption of a predetermined amount of said energy and said time control shifting said driving connections at the end of said time period if the said predetermined amount of energy has not been consumed during that period.

2. The combination of an electric watthour meter, two integrating watthour registers, each registering the watthours of metered energy, means for driving said registers by said watthour meter in proportion to the metered energy and means controlled by the time and also by the energy metered during a given time period for alternately connecting said driving means in driving relation to said registers, said metered energy causing the shifting of said driving means from one register to another after consumption of a predetermined amount of said energy and said time control shifting said driving connections at the end of said time period if the said predetermined amount of energy has not been consumed during that period.

3. The combination of an electric watthour meter, two integrating watthour registers, means for driving said registers by said watthour meter in proportion to the energy metered during a given time period, means for alternately connecting said driving means in driving relation to said registers, time controlled means for controlling the shifting of said driving means from one of said registers to the other, means controlled by the said metered energy for controlling the shifting of said driving means from one of said registers to the other, said metered energy causing the shifting of said driving means from one register to another after consumption of a predetermined amount of said energy and said time control shifting said driving connections at the end of said time period if the said predetermined amount of energy has not been consumed during that period and time controlled means for restoring said metered energy controlled means to its initial condition.

PHILIP SPORN.
RAY H. WOLFORD.
WILLIAM C. NEIN.